United States Patent
Chiu et al.

[11] Patent Number: 5,995,652
[45] Date of Patent: *Nov. 30, 1999

[54] PATTERN SEARCHING METHOD USING NEURAL NETWORKS AND CORRELATION

[75] Inventors: Chinchuan Chiu, New City, N.Y.; Toru Oki, Allendale; Philip Paolella, Fort Lee, both of N.J.

[73] Assignees: Sony Corporation, Tokyo, Japan; Sony Corp. of America, New York, N.Y.

[*] Notice: This patent is subject to a terminal disclaimer.

[21] Appl. No.: 08/910,265

[22] Filed: Aug. 13, 1997

Related U.S. Application Data

[63] Continuation of application No. 08/376,544, Jan. 23, 1995, Pat. No. 5,696,838.

[51] Int. Cl.⁶ .................................................. G06K 9/62
[52] U.S. Cl. .......................................... 382/159; 382/181
[58] Field of Search ................................ 382/155, 156, 382/158, 159, 209, 278, 181, 195, 218, 228, 276, 279, 282, 294; 349/17; 364/148.03; 706/15

[56] References Cited

U.S. PATENT DOCUMENTS

| | | |
|---|---|---|
| 5,048,100 | 9/1991 | Kuperstein ............................. 382/157 |
| 5,095,459 | 3/1992 | Ohta et al. ............................. 706/40 |
| 5,245,672 | 9/1993 | Wilson et al. .......................... 382/179 |
| 5,542,006 | 7/1996 | Shustorovich et al. ................. 382/156 |

*Primary Examiner*—Jon Chang
*Assistant Examiner*—Jayanti K. Patel
*Attorney, Agent, or Firm*—Jerry A. Miller; Gary B. Goates; Lisa A. Rode

[57] ABSTRACT

A pattern searching method using neural networks and correlation. This method combines the quickness and adaptiveness of neural networks with the accuracy of the mathematical correlation approach. Images are divided into small sub-images which are presented to the trained neural network. Sub-images that may contain the pattern or partial pattern are selected by the neural network. The neural network also provides the approximate location of the pattern, therefore the selected sub-images can be adjusted to contain the complete pattern. Desired patterns can be located by measuring the new sub-images' correlation values against the reference models in a small area. Experiments show that this superior method is able to find the desired patterns. Moreover, this method is much faster than traditional pattern searching methods which use only correlation.

9 Claims, 7 Drawing Sheets

PATTERN SEARCHING METHOD USING NEURAL NETWORKS AND CORRELATION

CROSS REFERENCE TO RELATED DOCUMENTS

This application is related to U.S. patent applications Ser. No. 07/955,526 now abandoned to Oki et al., Ser. No. 07/955,563 now abandoned (Aug. 8, 1994) to Oki, and Ser. No. 07/955,522 now abandoned, all filed Oct. 1, 1992, now abandoned (Aug. 8, 1994) which are hereby incorporated herein by reference. This application is continuation of U.S. patent application Ser. No. 08/376,544 filed Jan. 23, 1995, (now allowed U.S. Pat. No. 5,696,838.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

1. Field of the Invention

This invention relates generally to the field of pattern searching and recognition. More particularly, this invention relates to use of a combination of neural networks with correlation techniques to quickly and accurately recognize patterns with reduced computational complexity.

2. Background of the Invention

Pattern Searching is one of the most extensively used functions in industrial image systems. Applications for pattern searching can be generally divided into three categories: alignment, gauging, and inspection. Conventional pattern searching basically involves two steps of operations. First comes the problem of locating one or more regions of interest in a larger image, then isolating the patterns in the regions of interest for the next step of the process. For example, in circuit board alignment applications, the second step is to find the exact locations of the pre-defined fiducial marks and then align the circuit board to a reference based on the positions of those found fiducial marks.

In the past few years, neural networks have been quite successfully applied to many pattern recognition and vision problems. Several such applications are described in Fukushima, K., "Neocognition: A hierarchical neural network capable of visual pattern recognition," Neural Networks 1, 119–130, 1988; Rumelhart D. E., Hinton, G. E., and Williams, R. J., "Leaning internal representation by back-propagating errors," Nature, 323:533–536, 1989; and LeCunn, Y. and et al, "Backpropagation Applied to Handwritten Zip Code Recognition," Neural Computation 1, 541–551, 1989. However, most of the applications in these areas have been using binary images, for example character recognition. To accurately locate patterns, in general, gray-level images are required. Due to the variations in brightness in gray-level images, it is difficult to train neural networks to accurately locate patterns in different lighting conditions.

On the other hand, the correlation method which measures the geometric similarity between an image and reference models has been widely used in many industrial image systems. One of the most important properties in correlation is that correlation is independent of uniform linear changes in brightness in either the models and images. However, correlation itself is a very computationally expensive operation. Moreover, to search patterns, correlation has to be applied to all possible locations in the regions that may contain the patterns. For example, to search an 8×8 pattern in a 16×16 image, 81 correlations are required to find the best correlation between the pattern and model. Therefore, special hardware is usually required as described in "Technical Description: Vision for Industry", Cognex Corporation, 1990.

The present invention seeks to ameliorate some of these problems by using the speed of neural network techniques to complement the accuracy and grey scale handling abilities of correlation techniques.

SUMMARY OF THE INVENTION

It is an object of the present invention to provide an improved pattern recognition system which is both fast and reliable.

It is a feature that the present invention provides enhanced speed and simplicity over correlation techniques and improved accuracy and simplicity over neural network techniques.

These and other objects, advantages and features of the invention will become apparent to those skilled in the art upon consideration of the following description of the invention.

The method of the present invention combines the quickness and adaptiveness of the neural networks approach and the accuracy of the mathematical correlation. First of all, this method divides images into small chunks of sub-images which are of the same size as a reference model representing a target pattern. Similar to animal's visual systems which can quickly move their eye(s) to center on the visual field of interest, this method quickly processes each sub-image using a neural network, which is pre-trained with the reference models and partial reference models, to search for the regions (candidate sub-images) which may contain the desired pattern. The neural network not only provides the locations of the candidates, but also which part of the reference models, which can be used to find the approximate center positions of the model patterns. Using this information, new centered sub-images are created and then sent to the same neural network to further reduce the number of candidates. In experiments, only about 2.5% of sub-images are selected by the neural network as candidate sub-images. Correlation is then used to find the patterns from these candidates. Since the neural network also provides the approximate center positions of the reference models in the candidate, the number of correlations required to search the patters in each candidate is minimal. Thus the processing speed is further increased.

The present invention provides a pattern searching method using neural networks and correlation. This method combines the quickness and adaptiveness of neural networks with the accuracy of the mathematical correlation approach. Images are divided into small sub-images which are presented to the trained neural network. Sub-images that may contain the pattern or partial pattern are selected by the neural network. The neural network also provides the approximate location of the pattern, therefore the selected sub-images can be adjusted to contain the complete pattern. Desired patterns can be located by measuring the new sub-images' correlation values against the reference models in a small area. Experiments show that this superior method is able to find the desired patterns. Moreover, this method is much faster than traditional pattern searching methods which use only correlation.

In one aspect of the present invention, a method for locating a target pattern in an image, includes the steps of: dividing the image into a plurality of sub-images; and processing each sub-image with a neural network to locate a candidate sub-image which includes a candidate pattern; processing the candidate sub-image with a correlator to determine if the candidate sub-image actually contains the target pattern.

In another aspect of the present invention a method for locating a target pattern in an image, includes the steps of: dividing the image into a first plurality of sub-images; processing each sub-image with a neural network to identify a second plurality of sub-images each of which includes at least a portion of a candidate pattern; generating a third plurality of sub-images, each having a candidate pattern at an approximate center thereof; processing the third plurality of sub-images with a neural network to produce a fourth plurality of sub-images; and processing the fourth plurality of sub-images with a correlator to determine if each of the fourth plurality of sub-images actually contains the target pattern.

A machine vision device for recognizing a target pattern in an image according to the invention includes an arrangement for dividing the image into sub-images. A neural network processes a binarized version of the sub-images to select candidate sub-images which have candidate patterns which may match the target pattern. A computer computes a center location of the target pattern in each the candidate sub-images. Candidate sub-images are then centered about the calculated center location. A correlator correlates the centered candidate sub-images with a reference model to select candidate patterns which match the target pattern.

A method of training a neural network according to the invention includes the steps of: selecting a pattern to be matched by the neural network; selecting portions of the pattern to be matched by the neural network; compiling a repertoire of training patterns including the pattern and the selected portions of the pattern; and applying the repertoire of training patterns to the neural network in a backpropagation training process.

In another aspect of the invention a method for locating a target pattern in an image, includes the steps of: processing the image with a neural network to locate a candidate pattern; and correlating the candidate pattern with a reference model to determine if the candidate pattern matches the target pattern.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described.

Figure 1:
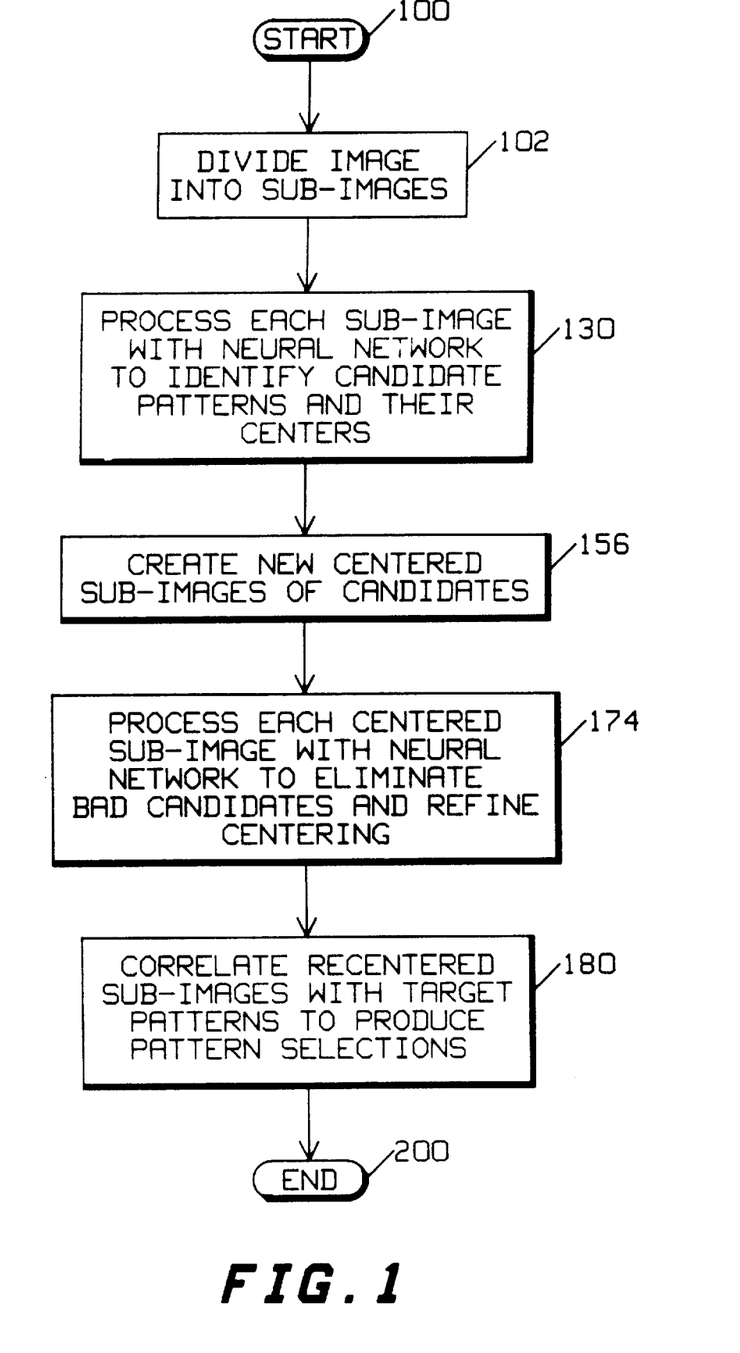
FIG. 1 is a high level flow chart of the process used by an embodiment of the present invention.
Figure 2:
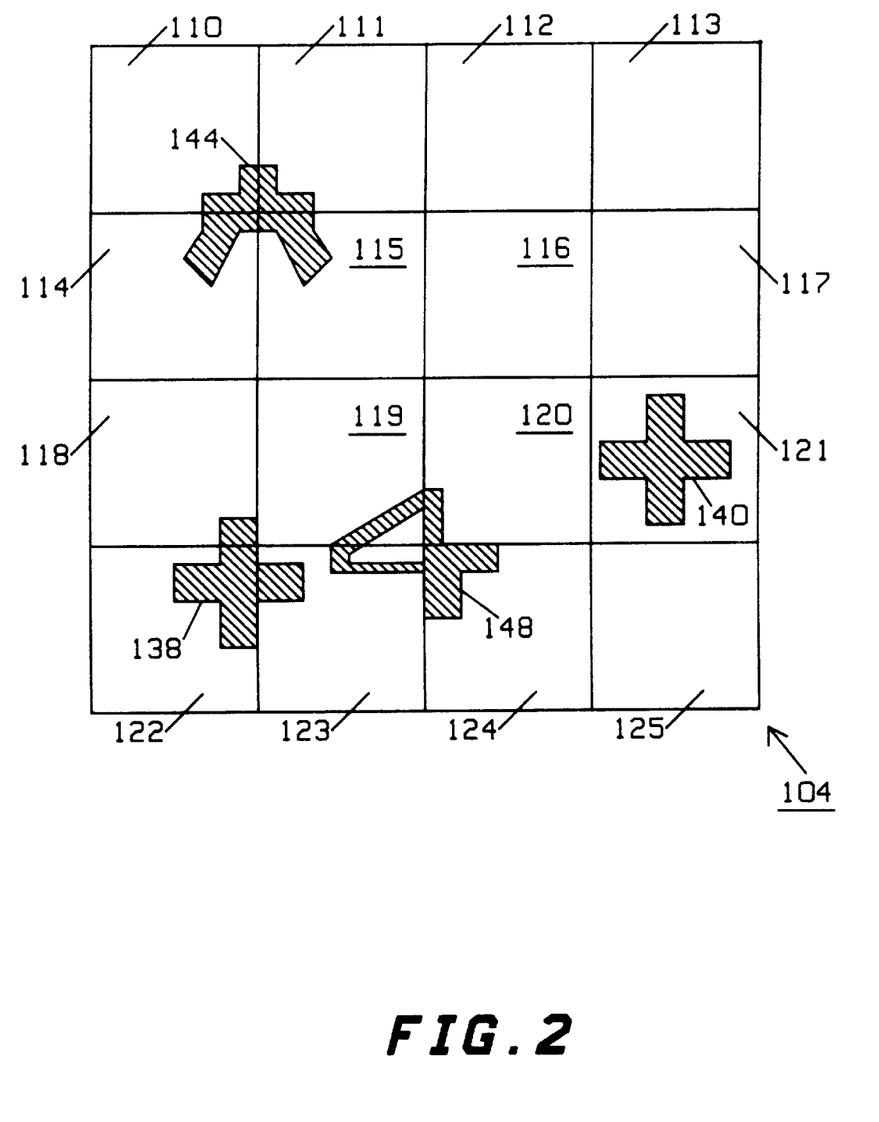
FIG. 2 is an illustrative image divided into sub-images to be searched for a target pattern.

Turning now to FIG. 1, a flow chart describing the basic process used in the present invention is presented. In this flow chart, the process starts at step 100 and an image which is to be processed is divided into sub-images in step 102. This is illustrated further in FIG. 2 where the overall image is designated as 104 which is divided into a 4×4 array of sixteen sub-images 110–125. If the main image 104 is, for example a 400×400 array of pixels, then each sub-image and the reference images might include 16×16 pixels.

Each sub-image is then processed by a neural network in step 130. The neural network is trained to recognize a predetermined target pattern which is to be found in image 104. In order to obtain a collection of candidates for further analysis, the neural network is trained to recognize the target pattern as well as significant fragments of the pattern as will be described in detail later. For example, if the pattern to be detected is a cross (such as in the case of an alignment mark for a printed wiring board), the network recognizes not only the cross pattern but significant fragments of the pattern (in experiments, fragments greater than 25% of the size of the target pattern are used). This is done so that candidate patterns which do not fully reside inside a sub-image are detected. Such a candidate pattern residing partially inside sub-images 118, 122 and 123 is shown as 138 in FIG. 2. A candidate pattern 140 is shown residing fully inside sub-image 121. Those skilled in the art will understand that the image 104 may include other patterns (all of which are not shown) from which the target pattern must be distinguished. For example, patterns 144 and 148 must be eliminated as possible candidates, even though the fragments residing in sub-images 110 and 148 appear to be potential candidates.

Upon processing the sub-images in step 130, the neural network indicates that there are candidate patterns in several sub-images. For example, sub-images 110, 121, 122, and 124 may appear to contain the target pattern or fragments of the target pattern.

Based upon the output of the neural network (i.e. depending upon which output unit of the neural network produces the largest output), the approximate center of the candidate patterns can be deduced. From this information, a new set of centered sub-images are defined at step 156. These centered sub-images are shown as 160, 162, 164 and 166 in FIG. 3. By centering the sub-images about the candidate patterns, the following processing steps become more reliable. At step 174, each of the candidate sub-images 160, 162, 164 and 166 are processed by a neural network. This may be the same neural network or a different neural network trained to recognize only fill and approximately centered target patterns. In this example, assume that at step 174 the neural network determines that pattern 144 is a poor candidate when analyzed in sub-image 160. This leaves three remaining candidate patterns 162, 164 and 166 as possible matches for the target cross pattern.

Figure 4:
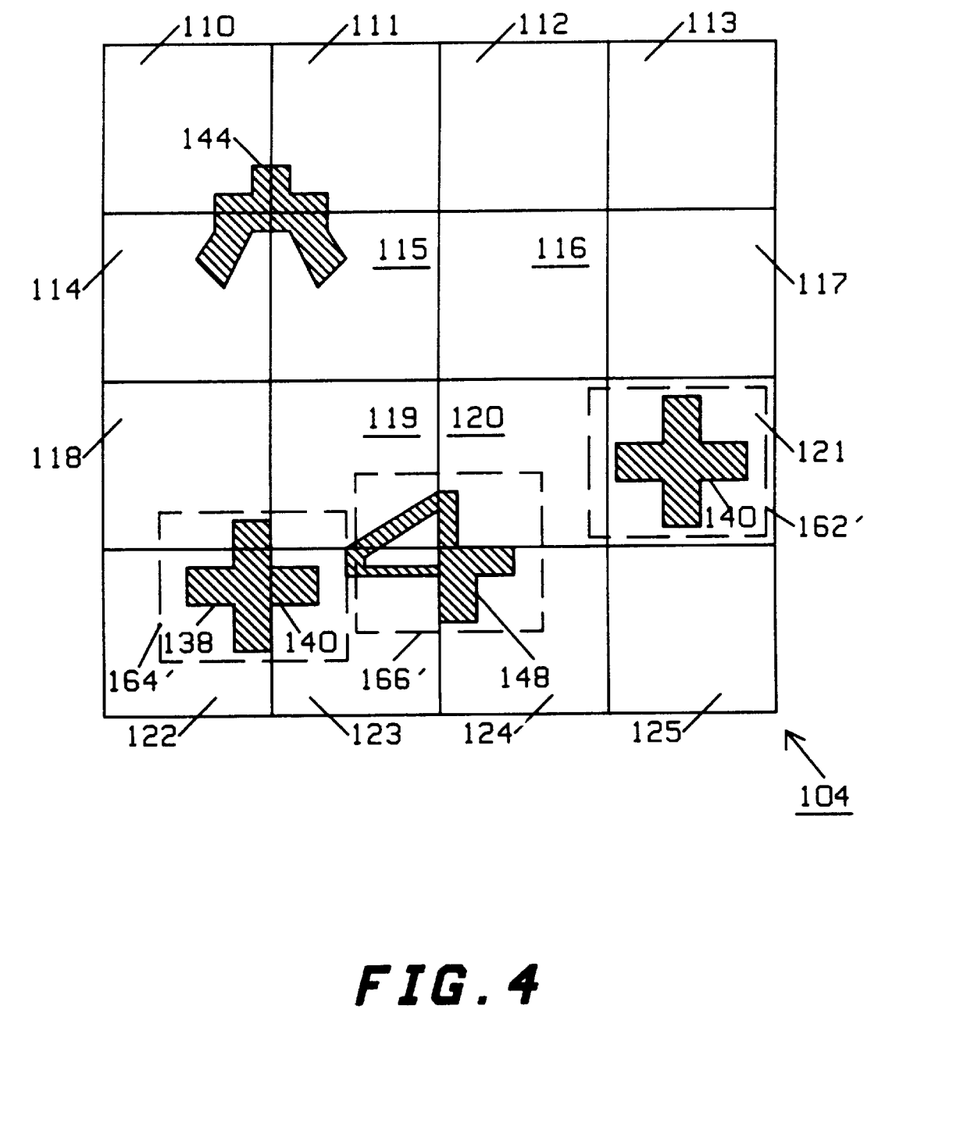
FIG. 4 shows centered sub-images remaining after a second stage of processing by the neural network.

After processing by the neural network, the remaining candidate centered sub-images 162, 164 and 166 are re-centered based upon the analysis of the neural network so that the center positions are refined to produce re-centered sub-images 162', 164' and 166' of FIG. 4. These images are then processed in step 180 with a correlator to determine which candidate patterns have high enough correlation with the target pattern to be considered a match. Since the images are now well centered, the correlation process can be simplified and produces a highly reliable output indicative of which of the remaining candidates are matches for the target pattern. Also, since the images are well centered, the correlation needs to be performed only over a small area. In this case, the pattern 148 of sub-image 166' is eliminated and patterns 138 of sub-image 164' and pattern 140 of sub-image 162' are selected as matches for the target cross pattern.

With the above as an overview of the operation of the invention, the details of the preferred embodiments are now considered.

PATTERN SEARCHING ALGORITHM

The pattern searching algorithm can be divided into three steps. Assume the size of the reference model is m×n. First of all, the original images are divided into m×n sub-images to match the size of the reference model. After each sub-image is locally binarized, it is presented to the trained neural network which will be described in the next section. If one and only one of the output units exceeds a threshold, this sub-image is considered as a candidate. The origin coordinate, which is the coordinate of the top right pixel of the sub-image and the neural network output unit number with the highest score associated with the candidate are kept for the next step as a representation of the center of the pattern. A more deliberate classification scheme is described in a later section.

Figure 3:
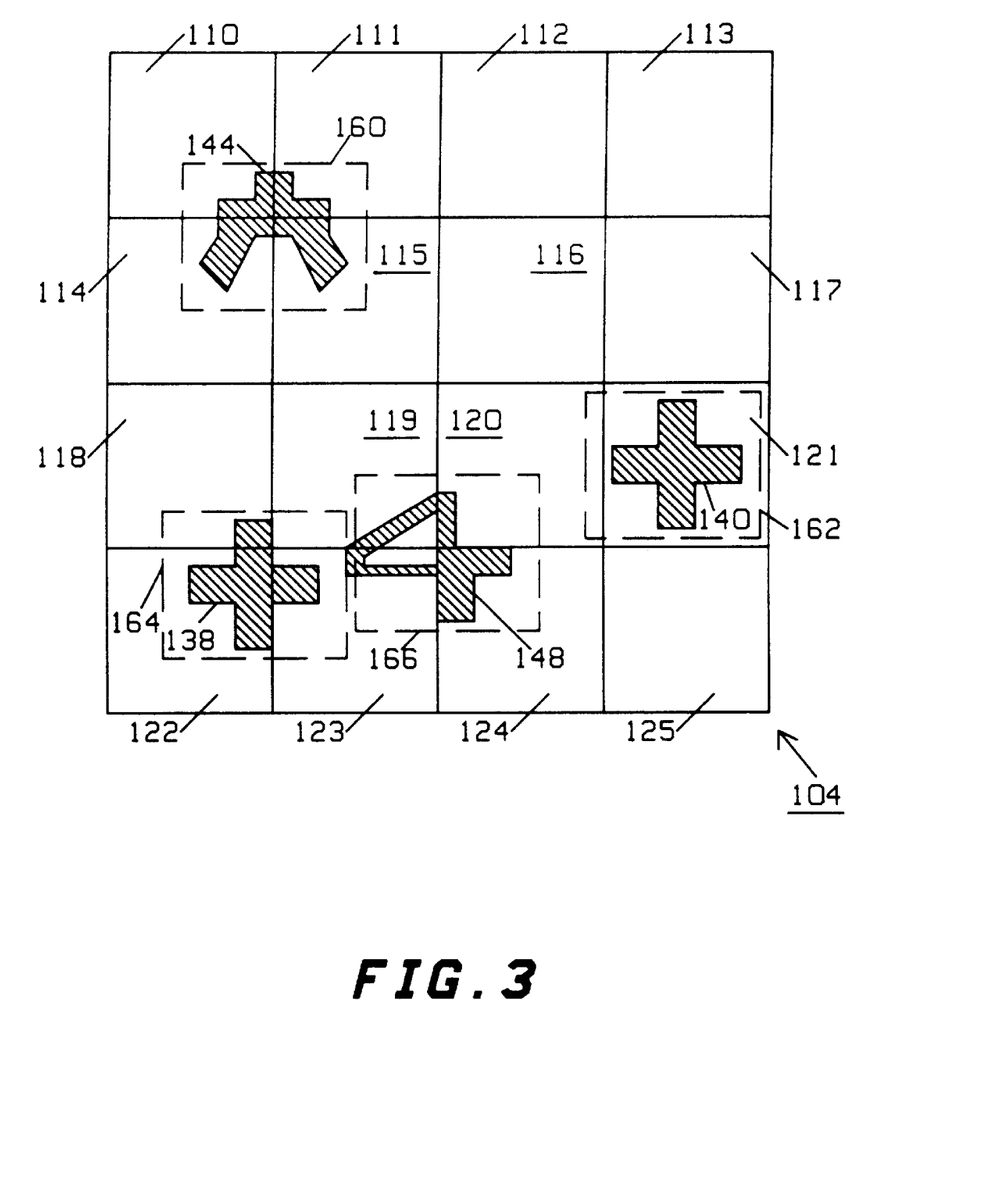
FIG. 3 illustrates the centering of patterns in centered sub-images.

After every sub-image is presented to the neural network, a new gray-level m×n sub-image is created from the original image for each candidate selected in previous step. The new images are created in the following way. Suppose that the origin coordinate of the candidate image is $(x_o, y_o)$ and the neural network output unit number with the highest score for a candidate is k. The output unit number k corresponds to class $k_c$ to which the sub-image is assigned by the neural network. Assume that center position of class $k_c$ is $(c_x, c_y)$, the new sub-image's origin coordinate is chosen as:

$$\text{origin} = \left(x_0 + c_x - \frac{m}{2}, y_0 + c_y - \frac{n}{2}\right)$$

as shown in FIG. 3.

The new sub-image is binarized again and presented to the same neural network (in other embodiments, a second neural network could be used). The same classification scheme is applied to each new sub-image. The origin coordinate and the neural network output unit number of the highest score for each new candidate is recorded again. This provides a refined estimate of the center of the sub-image as shown in FIG. 4.

A new sub-image is created again for each candidate selected by the neural network in the previous step using the same approach described in the previous paragraph. However, the new sub-image is not binarized. Normalized correlations against each gray-level reference model are performed in the region which centers on the center position of class $k_c$ corresponding to the neural network output unit number with the highest score obtained from previous step. The highest score and the location with the highest score is used as the correlation value and location for the candidate. The candidates with the highest correlation values are selected as the patterns. Since the center of the candidate pattern is now known with a reasonably high degree of accuracy, there is no need to perform correlations across the entire sub-images.

The Neural Network Structure

To demonstrate the power of this method, the method has been used to locate multiple fiducial marks in 400×400 pixel circuit board images. For simplicity, we assume the reference models are 16×16 cross fiducial marks which can be found in circuit boards. The neural network used in experiments is a 3-layered feed-forward network with 256, 15, and 25 units for input, hidden, and output layer, respectively. One input unit is selected for each input pixel. The number of hidden units was selected heuristically to provide a minimal number of units for network simplicity while being large enough to provide accurate classification and provide an adequate weight space for convergence. Twenty five output units were selected to represent the twenty five classes of cross patterns and partial patterns as will be described later. 16×16 binarized images from 400×400 circuit board gray-level images, are the inputs to this neural network.

The images were taken by a SONY SUPER imaging system. Four artificial binarized cross fiducial patterns are used to generate training patterns for the neural network. These four patterns are shown in APPENDIX I. For training, these patterns are modified in a manner such as those of the above-referenced co-pending applications to have varying shape, size and thickness. These four patterns are given in APPENDIX II. Four 256-gray-level cross patterns taken from real images are used as reference models for correlation. The numerical values (between 0 and 255) for these four patterns are given in APPENDIX III with gray scale images shown in APPENDIX IV.

Training

Figure 5:
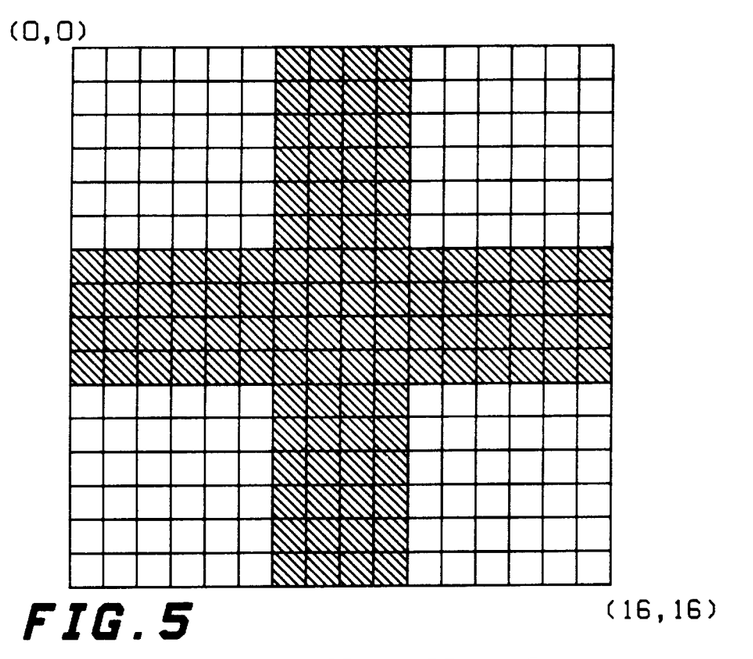
FIG. 5 represents an example cross pattern.

In order to have the neural network recognize fragments of the cross pattern, the binarized patterns used for training the neural network include a perfect 16×16 reference model as shown in FIG. 5. The coordinate of the center is (8, 8). If the cross pattern's center is shifted to every coordinate from (1, 1) (top right) to (15, 15) (bottom left) 225 different patterns are created. These 225 patterns are shown graphically in APPENDIX I. The pixels shifted out of this 16×16 square are neglected. These 225 patterns can be divided into 25 classes based on the patterns' center positions with each of the 25 classes containing 9 different partial patterns, which are indexed from left to right and bottom to top by their center positions. For example, the first pattern of each class is the pattern centered on the bottom left position of the nine patterns. This indexing mechanism can be also seen in FIG. 5.

Figure 6:
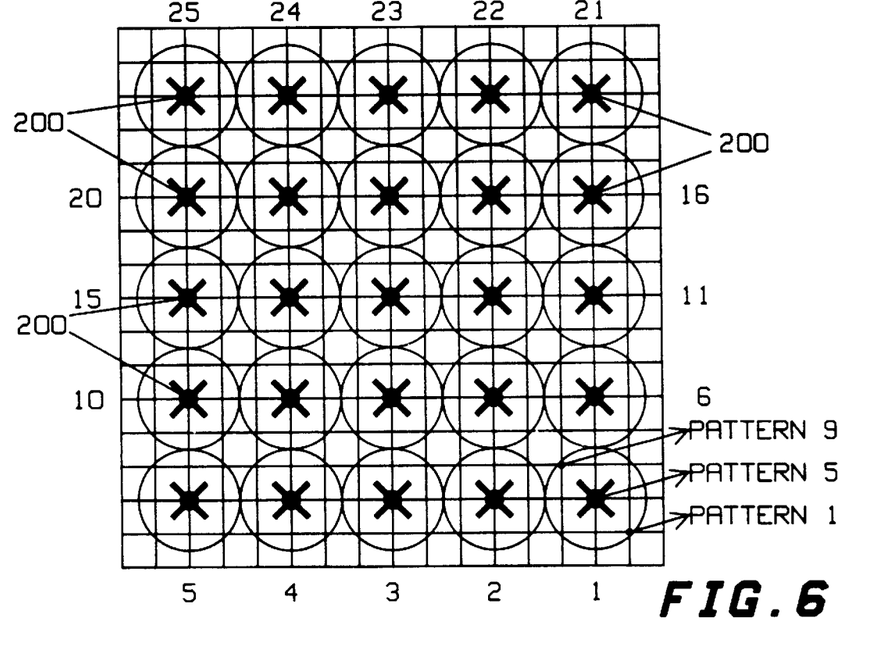
FIG. 6 shows the center position of 25 classes of partial patterns.

The neural network is trained so that each of the 25 output units in the neural network represents one of the 25 classes of patterns shown in FIG. 6. Therefore, if output unit 15 provides the largest output, the pattern can be assumed to be centered at any of the center positions 200 of FIG. 6. Of course, this yields only an approximation of the center within a region, but by performing the same process again, the approximation is refined while maintaining the simplicity of the neural network.

In an alternative embodiment, the neural network can have one output for each possible position of the center of the pattern. However, this requires 225 output units for the present invention and the complexity of the neural network increases substantially. In this embodiment, only one step of neural network processing is required.

Following the procedure described above, 900 partial patterns are created as training patterns for the neural network from the four artificial binarized cross patterns shown in APPENDIX II. Backpropagation training is then performed. In the prototype system, the initial weights to each unit were set to random values in [−0.5/sqrt(F), 0.5/sqrt(F)], and the training rate 0.5/sqrt(F), where F is the number of incoming connections of the unit to which the connection linked. The training process was stopped when each pattern was classified correctly in the following sense $$\max_{0 \leq i \leq 24} |O_i - t_i| \leq 0.2$$

where $O_1$ and $t_1$ are the ith element of the output and desired states.

Desired Output Definition for Training Patterns

In the back-propagation training process, each training pattern's output is compared to its desired output. The difference between the actual output and the desired output is propagated back layer by layer to update the weights for each layer according to the conventional back propagation learning rule. Define the desired output for training pattern P is $(d_1, d_2, \ldots, d_{25})$, and the x and y distance of the pattern P centered in (x, y) to a class K centered in $(k_x, k_y)$ as:

$$D_x(P, K) = |k_x - x| \text{ and } d_y = |k_y - y|$$

Then the ith element of the desired output of training pattern P is defined as:

$$d_k = 1 - 0.05 \times [D_x(K, P) + D_y(K, P)] \text{ if } P \in \text{Class K; or}$$

$$d_k = 0.1 \text{ if } P \in \text{Class K, } D_x[P, K] \leq 2, \text{ and } D_y[P, K] \leq 2, \text{ or}$$

$$d_k = 0, \text{ otherwise}$$

For example, the desired output for the fifth pattern of class 1 is defined as $(1, 0, 0, \ldots, 0)$ and the first pattern of class 13 is defined as: (0, 0, 0, 0, 0, 0, 0.1, 0.1, 0, 0, 0, 0.1, 0.90, 0, 0, 0, 0, 0, 0, 0, 0, 0, 0, 0, 0).

Classification Scheme

Figure 8:
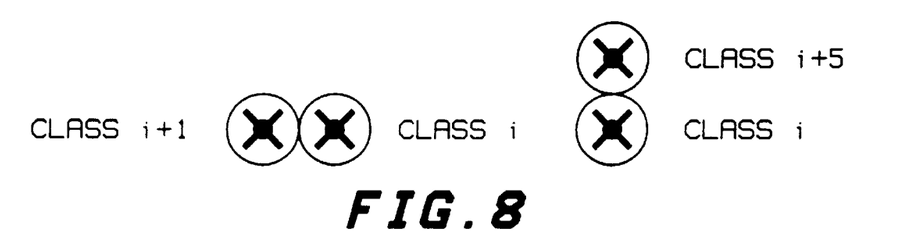
FIG. 8 illustrates the classification system when two output units exceed a threshold.
Figure 9:
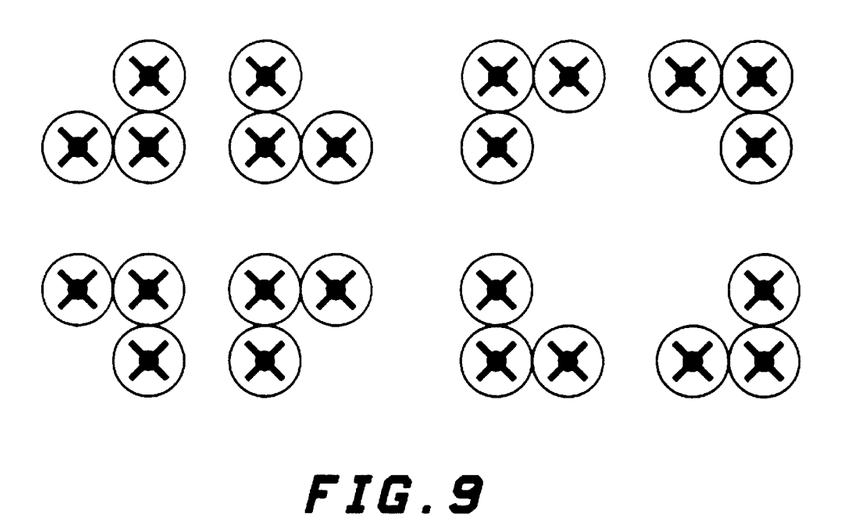
FIG. 9 illustrates the classification system when three output units exceed a threshold.
Figure 10:
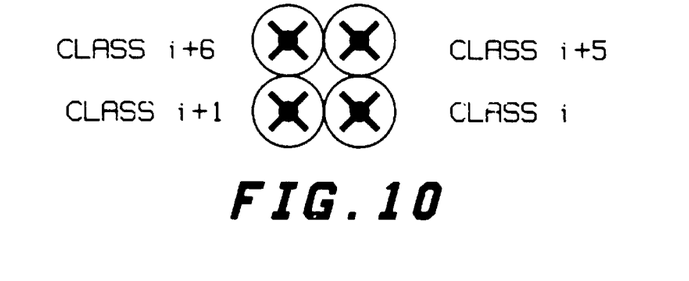
FIG. 10 illustrates the classification system when four output units exceed a threshold.

To increase the reliability of this method, the following classification scheme is used. Two thresholds, T1 and T2, where T1≦T2, are utilized in this classification scheme. In the fiducial pattern finding example, T1 was set to 0.3 and T2 was set to 0.5. Any output unit with a score greater than T1 is recorded. There are four cases in which the pattern can be considered a candidate pattern. In the first case, there is one and only one output unit with a score greater than T2. The corresponding class is selected to be the one to which the pattern belongs. The second case is the case where two output units have outputs greater than T1. This second case is shown in FIG. 8 in which two output units are associated with adjacent classes. In this case, the output unit with the highest score is selected to be the class in which the pattern belongs. In the third case, there are three output units with a score greater than T1. The third case contains eight possible sub-cases which are shown in FIG. 9. In the third case, the class adjacent the other two is selected to be the correct class to which the input pattern belongs. In the fourth case, shown in FIG. 10, the output unit with the highest score is selected as the class to which the pattern belongs. Those skilled in the art will recognize many variations of the present scheme for classification of the patterns.

Normalized Correlation

Normalized correlation is a measure of the geometric similarity between an image and a model. The normalized correlation used in this method is given by:

$$corr = \frac{256 \sum_{i=0}^{255} I_i M_i - \sum_{i=0}^{255} I_i \sum_{i=0}^{255} M_i}{\sqrt{\left[256 \sum_{i=1}^{255} I_i^2 - \left(\sum_{i=0}^{255} I_i\right)^2\right]\left[256 \sum_{i=0}^{255} M_1^2 - \left(\sum_{i=0}^{255} M\right)^2\right]}}$$

where I, and M, are the value of ith pixel of the candidate image and the reference model, respectively. The independence of normalized correlation from linear brightness change is one of its most important properties.

Experimental Results

This pattern searching method has been applied to find cross shaped fiducial marks in circuit boards. No knowledge regarding the possible regions containing the fiducial marks is given. In this test, each fiducial mark is different from the others due to very poor lighting condition intentionally used.

The results show that about 10% of the 16×16 sub-images were picked up by the neural network in the first step and 0.87% candidates were selected by the neural network in the second step. For each 400×400 image, about 744 16×16 sub-images were presented to the 3-layered neural network.

Twenty five normalized correlations against each reference model were measured in the 5×5 region centered on the center point of the pattern of each candidate obtained from previous step. The highest score and the location with the highest score in the 100 normalized correlations was used as the correlation value and location for each candidate. The candidates with the highest correlation values were selected as the fiducial marks. For the two circuit board images assume 6 16×16 sub-images are picked by the neural network in the second step, only 300 normalized correlations are required for a 400×400 image.

Twelve circuit board images with different lighting condition were evaluated.

Table 1 shows the numbers of candidates selected by the neural network in the first and second step for each circuit board image. Step 3 represents the correlation step. Notice that there are two groups of circuit board images. The first group consists of image 1 to 8, and second group 9 to 12. The neural network selected fewer candidates in the first group than the second group. The same experiment has been repeated using 8-bit precision weights. No errors have occurred in the experiments. More importantly, this method is thousands of times faster than the traditional methods which use only normalized correlation.

TABLE 1

| IMAGE  | 1  | 2  | 3  | 4  | 5  | 6  | 7  | 8  | 9   | 10  | 11  | 12 |
|--------|----|----|----|----|----|----|----|----|-----|-----|-----|----|
| Step 1 | 59 | 49 | 44 | 35 | 38 | 44 | 47 | 44 | 121 | 117 | 119 | 96 |
| Step 2 | 4  | 4  | 4  | 5  | 6  | 7  | 6  | 7  | 5   | 8   | 6   | 5  |
| Step 3 | 2  | 2  | 2  | 4  | 4  | 4  | 4  | 3  | 1   | 1   | 1   | 2  |

Assuming 8-bit weights are used for the neural network and normalized correlation computations and the method is implemented in Sony's SUPER machine vision system, Table 2 shows the estimated processing times of searching different sizes of 8×8, 16×16, and 32×32 patterns in a 256×256 image. It's also assumed that the neural networks for 8×8, 16×16, and 32×32 templates are 64×6×9, 256×12×25, and 1024×24×100, respectively. In the calculation of neural network processing time, which includes the first and second step of this method, 10% candidates of the total sub-images are used. In the calculation of normalized correlation time, 2% candidates of the total sub-images, 4 gray-level reference models, and 5×5 searching area are assumed. It should also be noted that the patterns can be in any locations of an image provided that the orientation of the patterns is the same as the reference patterns.

TABLE 2

| Template Size | 8 × 8 | 16 × 16 | 32 × 32 |
|---|---|---|---|
| Neural Network Processing Time | 498 ms | 688 ms | 1106 ms |
| Normalized Correlator Processing Time | 105 ms | 118 ms | 164 ms |
| Total Processing Time | 603 ms | 806 ms | 1269 ms |

The above method for pattern searching combines the quickness and adaptiveness of neural networks and accuracy of the normalized correlation method. Experiments of finding fiducial marks in circuit boards have shown its superiority over traditional method in terms of processing time and accuracy. This general algorithm can be applied to many pattern searching problems, for example, to find an airport in a map. It is estimated that the processing time required to locate 16×16 patterns in a 256×256 image in Sony's SUPER machine vision system is approximately 800 ms. In many applications such as finding fiducial marks, pattern searching of the whole image may not be required. Therefore, the processing speed can be further increased.

Figure 7:
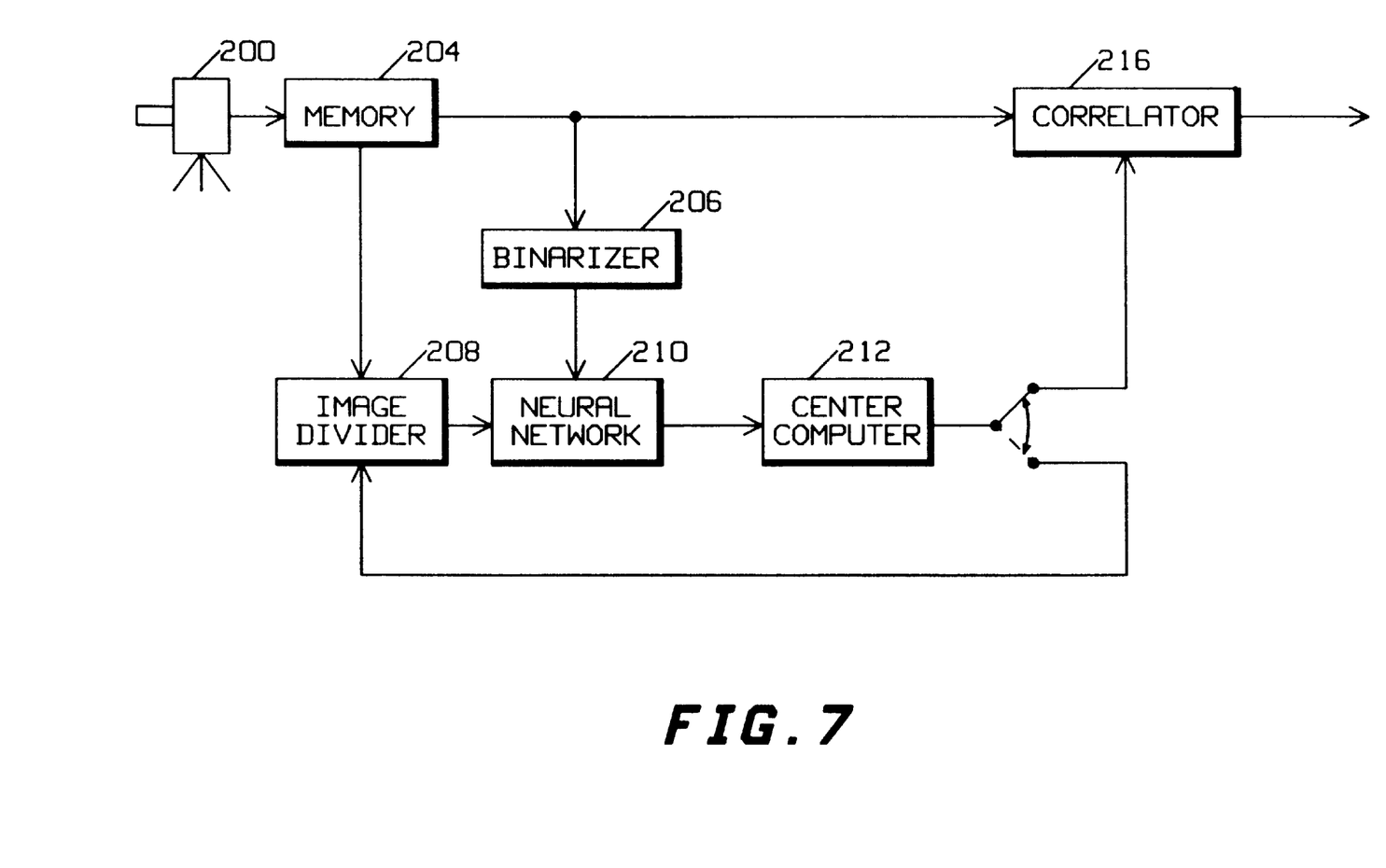
FIG. 7 shows a functional block diagram of a machine vision system using the present invention.

A machine vision system according to the present invention can be realized as shown in the functional block diagram of FIG. 7 in which a camera 200 produces an output of video pixels. The output of camera 200 may be stored in a memory 204. The pixels are binarized in a binarizer 206 by selecting those pixels with brightness greater than a threshold selected to be 1 and the remainder selected to be 0. This threshold may be predetermined or may be determined locally by a threshold algorithm. The image stored in memory 204 is divided into sub-images by an image divider 208. In the first pass, each sub-image is considered a candidate for containing a pattern match. Neural network 210 then processes each binarized sub-image as described previously to select a group of sub-images which are more likely to contain a pattern match.

Based upon the output of the neural network 210, a center computer 212 determines the approximate center location of each sub-image which contains a pattern the neural network 210 selects as a candidate pattern. After this first pass through the system, the center information computed by the center computer 212 is fed back to the image divider 208 so that the candidate sub-images are now supplied to neural network 210 in binarized form for a second pass.

In the second pass, the output sub-images are again centered by center computer 212. The revised and re-centered collection of sub-images is then processed by a correlator 216 which operates on grey level data from memory 204 to produce the output patterns which are deemed to match.

Those skilled in the art will recognize that the elements of the above system (except for the camera 200) may be implemented using a programmed computer. In other embodiments, hardware neural networks may be substituted. Similarly, two (or more) different neural networks may be used if desired or a single pass through one neural network may be advantageous and may be used. Also, additional passes through neural networks may be advantageous in some environments.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for locating a target pattern in an image, comprising the steps of:
   dividing said image into a first plurality of sub-images, without examining the content of said image;
   processing each sub-image with a neural network to select therefrom a second set of sub-images, each of which includes at least a portion of a candidate pattern;
   generating a third set of sub-images, each having one of said candidate patterns at an approximate center thereof;
   processing said third set of sub-images with a neural network to produce a fourth set of sub-images, each having one of said candidate patterns at an approximate center thereof; and
   processing said fourth set of sub-images with a correlator to determine which of said fourth set of sub-images contains said target pattern.

2. The method of claim 1, wherein the centering of said third and fourth sets of sub-images is determined by examining which output unit of said neural network has the largest output value.

3. The method of claim 1, wherein said step of processing said third set of sub-images includes finding an approximate center of one of said candidate patterns in each of said third set of sub-images and defining each of said fourth set of sub-images such that said approximate center of said candidate pattern is the approximate center of each of said fourth set of sub-images.

4. An apparatus for locating a target pattern in an image, comprising:
   means for dividing said image into a first plurality of sub-images, without examining the content of said image;
   means for processing each sub-image with a neural network to select therefrom a second set of sub-images, each of which includes at least a portion of a candidate pattern;

means for generating a third set of sub-images, each having one of said candidate patterns at an approximate center thereof;

means for processing said third set of sub-images with a neural network to produce a fourth set of sub-images, each having one of said candidate patterns at an approximate center thereof; and means for processing said fourth set of sub-images with a correlator to determine which of said fourth set of sub-images contains said target pattern.

5. The apparatus of claim 4, wherein said means for processing said third set of sub-images is further a means for examining which output unit of said neural network has the largest output value.

6. The apparatus of claim 4, wherein said means for processing said third set of sub-images is further a means for finding an approximate center of one of said candidate patterns in each of said third set of sub-images and for defining each of said fourth set of sub-images such that said approximate center of said candidate pattern is the approximate center of each of said fourth set of sub-images.

7. An apparatus that locates a target pattern in an image, comprising:

a circuit configured to divide said image into a first plurality of sub-images, without examining the content of said image;

a neural network configured to process each sub-image to select therefrom a second set of sub-images, each of which includes at least a portion of a candidate pattern;

a circuit configured to generate a third set of sub-images, each having one of said candidate patterns at an approximate center thereof;

a neural network configured to process said third set of sub-images to produce a fourth set of sub-images, each having one of said candidate patterns at an approximate center thereof; and a correlator configured to process said fourth set of sub-images to determine which of said fourth set of sub-images contains said target pattern.

8. The apparatus of claim 7, wherein said neural network configured to process said third set of sub-images is further configured to examine which output unit of said neural network has the largest output value.

9. The apparatus of claim 7, wherein said neural network configured to process said third set of sub-images is further configured to find an approximate center of one of said candidate patterns in each of said third set of sub-images and configured to define each of said fourth set of sub-images such that said approximate center of said candidate pattern is the approximate center of each of said fourth set of sub-images.

* * * * *